United States Patent
Zafarnia et al.

(10) Patent No.: US 12,358,581 B2
(45) Date of Patent: Jul. 15, 2025

(54) BICYCLE TRAINING WHEEL ASSEMBLY

(71) Applicant: Babak Zafarnia, Houston, TX (US)

(72) Inventors: Babak Zafarnia, Houston, TX (US); Francois Martin, Houston, TX (US)

(73) Assignee: Babak Zafarnia, Houston, TX (US)

( * ) Notice: Subject to any disclaimer, the term of this patent is extended or adjusted under 35 U.S.C. 154(b) by 826 days.

(21) Appl. No.: 17/540,297

(22) Filed: Dec. 2, 2021

(65) Prior Publication Data

US 2022/0177062 A1    Jun. 9, 2022

Related U.S. Application Data

(60) Provisional application No. 63/121,332, filed on Dec. 4, 2020.

(51) Int. Cl.
*B62H 1/12* (2006.01)
*B60B 27/02* (2006.01)
*B62J 3/06* (2020.01)

(52) U.S. Cl.
CPC ............. *B62H 1/12* (2013.01); *B60B 27/023* (2013.01); *B62J 3/06* (2020.02)

(58) Field of Classification Search
CPC ........ B62H 1/12; B62H 7/00; B62H 2700/00; B60B 27/023; B60B 2900/3312; B60Y 2200/13
USPC ........................................................ 280/293
See application file for complete search history.

(56) References Cited

U.S. PATENT DOCUMENTS

| | | | | |
|---|---|---|---|---|
| 2,624,156 A | * | 1/1953 | Meyer, Jr. ................. | A63H 5/00 446/404 |
| 2,987,850 A | * | 6/1961 | Bergland .................... | B62J 3/06 446/404 |
| 3,097,447 A | * | 7/1963 | Peham ....................... | A63H 5/00 446/404 |
| 3,905,151 A | * | 9/1975 | Zweigle .................... | A63H 5/00 446/404 |

(Continued)

FOREIGN PATENT DOCUMENTS

| | | | | |
|---|---|---|---|---|
| CN | 106394735 A | * | 2/2017 | ............. B62H 5/145 |
| DE | 3834113 A1 | * | 5/1989 | ........... B60B 33/021 |

(Continued)

*Primary Examiner* — Valentin Neacsu
*Assistant Examiner* — Nathaniel William Watkins
(74) *Attorney, Agent, or Firm* — Panitch Schwarze Belisario & Nadel LLP

(57) ABSTRACT

A training wheel assembly includes an assembly frame and a training wheel rotatably attached to the assembly frame. The training wheel has a wheel axle extending therefrom and defining an axis about which the training wheel rotates, and an annular hub concentric with the wheel axle and rotationally fixed therewith. A plurality of successive ratcheted teeth facing the assembly frame form a circumferential inner edge of the wheel. An elastically deflectable tongue is attached to the assembly frame and is selectively extendible into a rotational path of motion of the ratcheted teeth, whereby upon rotation of the training wheel with respect to the assembly frame about the axis, contact of the elastically deflectable tongue with successive teeth of the plurality of ratcheted teeth generates an audible sound indicating that the training wheel is rotating.

14 Claims, 5 Drawing Sheets

(56) References Cited

U.S. PATENT DOCUMENTS

| | | | | |
|---|---|---|---|---|
| 4,018,450 A | * | 4/1977 | Rutledge | A63H 5/00 |
| | | | | 280/288.4 |
| 5,085,611 A | | 2/1992 | Sorensen et al. | |
| 5,611,558 A | * | 3/1997 | Randmae | B62J 3/06 |
| | | | | 280/288.4 |
| 6,419,256 B1 | * | 7/2002 | Clark | B62H 1/12 |
| | | | | 280/288.4 |
| 6,565,107 B1 | * | 5/2003 | Hartman | B62J 3/06 |
| | | | | 280/288.4 |
| 6,588,788 B2 | | 7/2003 | Clark | |
| 7,641,213 B1 | * | 1/2010 | Chen | B62H 1/12 |
| | | | | 280/293 |
| 7,694,988 B2 | | 4/2010 | Sturtevant | |
| 8,388,011 B2 | | 3/2013 | Spencer et al. | |
| 8,439,384 B1 | * | 5/2013 | Woods | A63H 5/00 |
| | | | | 280/288.4 |
| 10,807,663 B1 | * | 10/2020 | Nanouk | B62H 1/12 |
| 2005/0134019 A1 | * | 6/2005 | Plana | B62H 1/12 |
| | | | | 280/301 |
| 2009/0212531 A1 | * | 8/2009 | Sturtevant | B62J 3/06 |
| | | | | 280/288.4 |

FOREIGN PATENT DOCUMENTS

| | | | | |
|---|---|---|---|---|
| DE | 102022117238 A1 | * | 1/2024 | B62H 5/145 |
| GB | 190417783 A | * | 8/1905 | |

\* cited by examiner

BICYCLE TRAINING WHEEL ASSEMBLY

CROSS-REFERENCE TO RELATED APPLICATIONS

This application claims priority from U.S. Provisional Patent Application No. 63/121,332, titled "Bicycle Training Wheel Assembly", filed on Dec. 4, 2020, the entire contents of which are incorporated by reference herein.

BACKGROUND OF THE DISCLOSURE

The disclosure relates to a training wheel assembly for a two-wheel bicycle.

Novice bicycle riders often utilize training wheels to assist with remaining upright, preventing the bicycle and the rider from tipping over to one side or the other, as the rider learns to center balance the bicycle without assistance. One drawback of training wheels, however, is that a novice rider may not realize whether they are properly center balancing the bicycle on their own or if the training wheels are preventing tipping over.

It would, therefore, be advantageous to manufacture a training wheel assembly that notifies the bicycle rider, e.g., audibly, whether the training wheels are coming into contact with the ground surface, indicating that the rider is not sufficiently center balancing the bicycle on their own.

BRIEF SUMMARY OF THE DISCLOSURE

Briefly stated, one aspect of the present disclosure is directed to a training wheel assembly having an assembly frame and a training wheel rotatably attached to the assembly frame. The training wheel includes a wheel axle extending therefrom and defines an axis about which the training wheel rotates. An annular hub is concentric with the wheel axle and rotationally fixed with the wheel axle. The annular hub has a plurality of successive ratcheted teeth facing the assembly frame along an inner edge thereof. An elastically deflectable tongue is attached to the assembly frame and selectively extends into a rotational path of motion of the ratcheted teeth, whereby upon rotation of the training wheel with respect to the assembly frame about the axis, contact of the elastically deflectable tongue with successive teeth of the plurality of ratcheted teeth generates an audible sound indicating that the training wheel is rotating.

Briefly stated, another aspect of the present disclosure is directed to a training wheel assembly having an assembly frame and a training wheel rotatably attached to the assembly frame. The training wheel includes a wheel axle extending therefrom and defines an axis about which the training wheel rotates. An annular hub is concentric with the wheel axle and rotationally fixed with the wheel axle. The annular hub has a plurality of successive ratcheted teeth facing the assembly frame along an inner edge thereof. An elastically deflectable tongue is removably attached to the assembly frame and selectively oriented in (i) a first position, wherein the elastically deflectable tongue extends into a rotational path of motion of the ratcheted teeth or in (ii) a second position, wherein the elastically deflectable tongue is spaced away from the rotational path of motion of the ratcheted teeth. Upon rotation of the training wheel with respect to the assembly frame about the axis in the first position of the elastically deflectable tongue, contact of the elastically deflectable tongue with successive teeth of the plurality of ratcheted teeth generates an audible sound indicating that the training wheel is rotating. Conversely, in the second position of the elastically deflectable tongue, generation of the audible sound upon rotation of the training wheel with respect to the assembly frame about the axis is eliminated. The elastically deflectable tongue is also configured to be sufficiently elastic to permit rotation of the training wheel upon application of torque thereto while in the first position, and configured to have sufficient stiffness to at least reduce rotation of the training wheel in the absence of the application of torque thereto while in the first position.

BRIEF DESCRIPTION OF THE SEVERAL VIEWS OF THE DRAWINGS

The following description of an embodiment of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
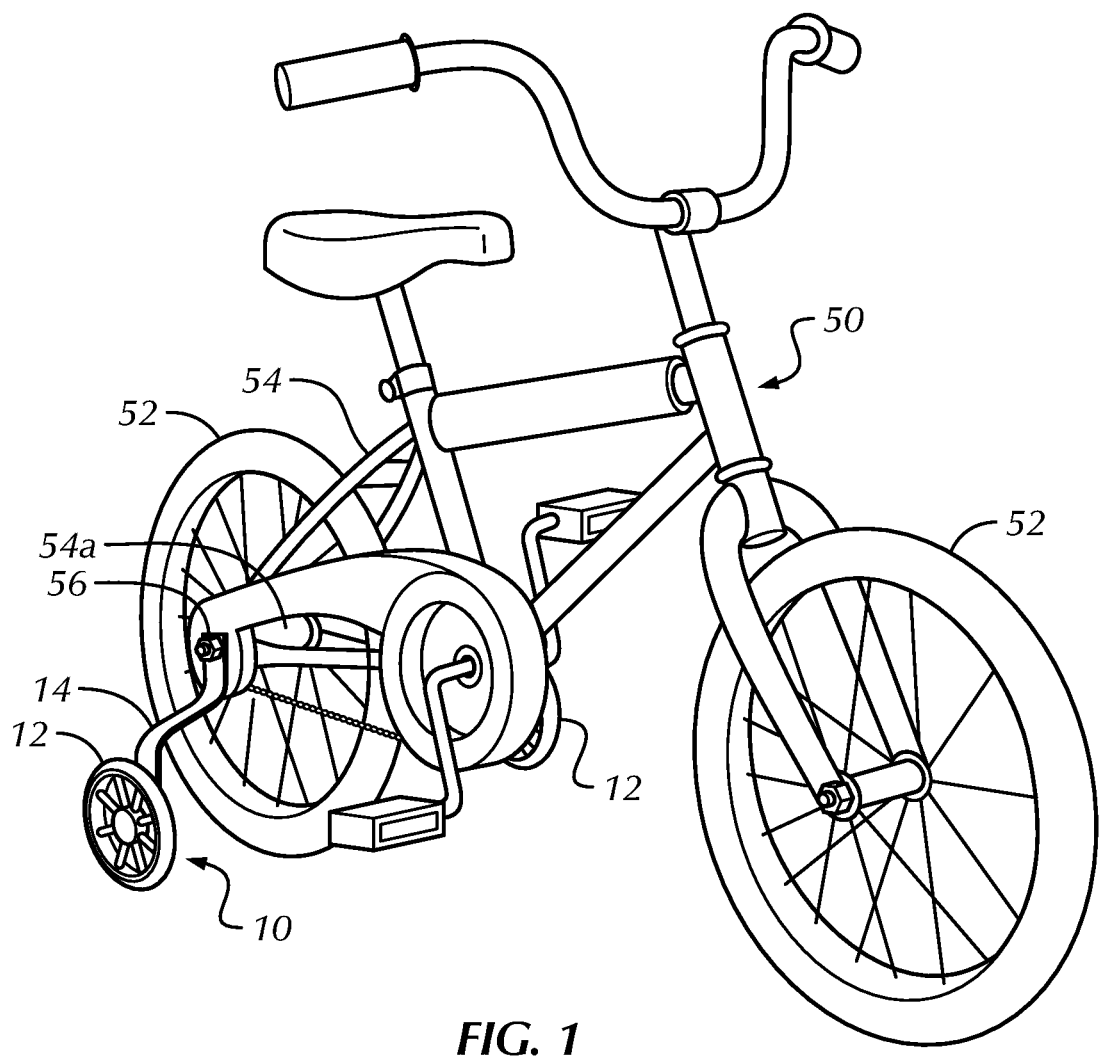
FIG. 1 is a front perspective view of a two-wheel bicycle having a training wheel assembly according to an example embodiment of the present disclosure attached.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the training wheel assembly, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-6 a training wheel assembly, generally designated 10, for attachment to a conventional two-wheel bicycle 50 (see FIG. 1), having front and rear wheels 52 rotatably attached to a bicycle frame 54. Generally, a pair of the training wheel assemblies 10 is mounted to the bicycle frame 54, e.g., to a rear axle 54a of the bicycle 50, extending laterally outwardly from bicycle frame 54 in mirrored fashion relative to one another about the rear wheel 52. As should be understood, however, the training wheel assembly 10 is also attachable to other types of vehicles that require balancing to safely operate, such as, for example, without limitation, a scooter.

As shown best in FIGS. 2-6, the training wheel assembly 10 includes a training wheel 12 rotatably attached to an assembly frame 14, which is attachable with the bicycle frame 54. As should be understood by those of ordinary skill in the art, at least a circumferential periphery of the training wheel 12 (i.e., the portion configured for contact with the ground surface during use) is generally constructed of a polymeric material or the like. The assembly frame 14 may be constructed of a metal, a hard polymer, a combination thereof or the like. In the illustrated embodiment, the assembly frame 14 is generally Z-shaped or S-shaped, i.e., the assembly frame 14 includes an upper, generally linear and vertically extending (first) section 14a and a lower, generally linear and vertically extending (second) section 14b connected to one another by a middle, generally linear, or curvilinear, generally horizontally extending (third) section 14c, but the disclosure is not so limited. In the illustrated configuration, the lower section 14b and the horizontal section 14c define a curved corner therebetween and the horizontal section 14c and the upper section 14a defined a curved corner therebetween, but the disclosure is not so limited.

Figure 3:
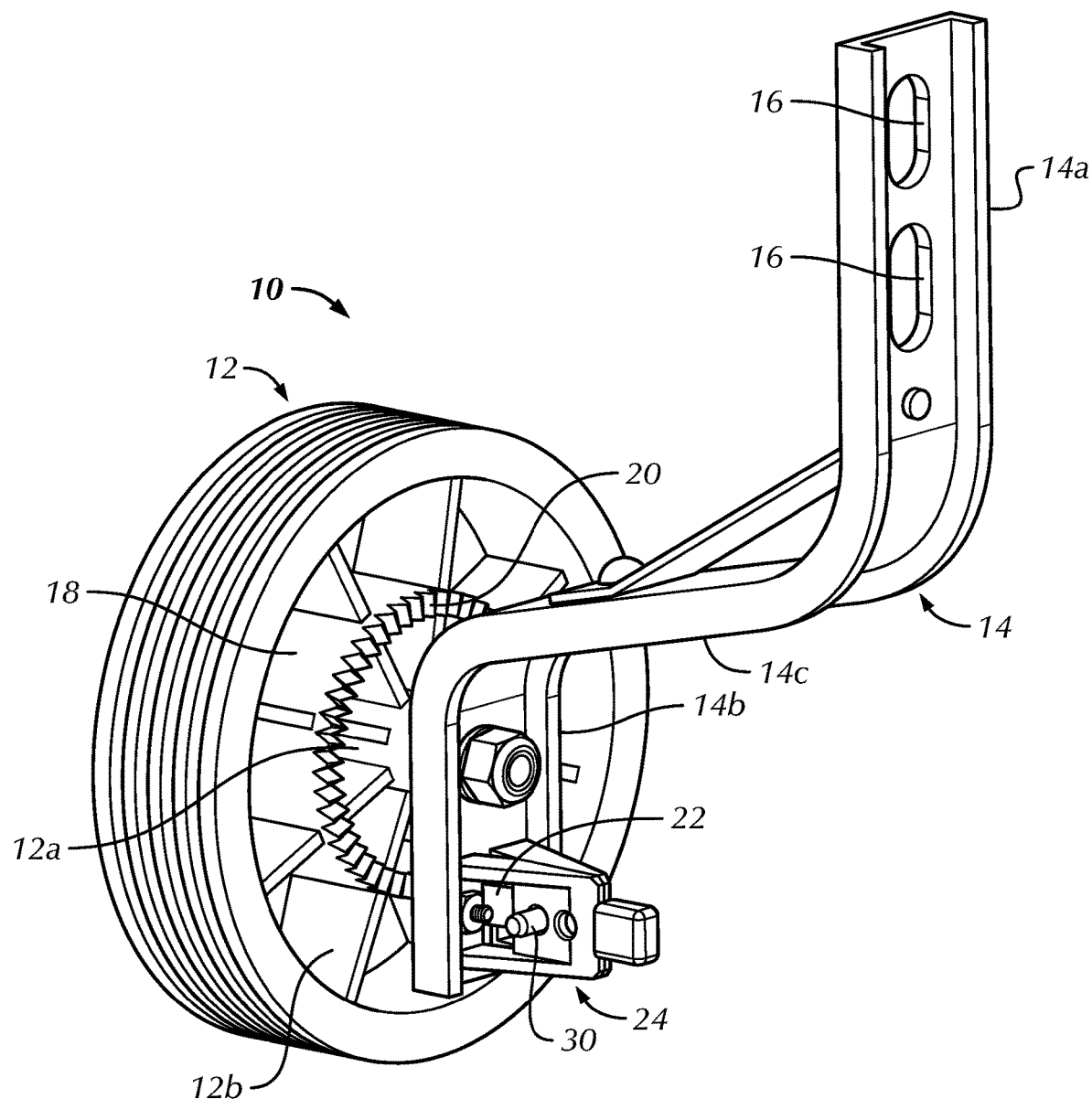
FIG. 3 is an alternative front perspective view of the training wheel assembly of FIG. 2, with the deflectable tongue thereof in the first position.
Figure 4:
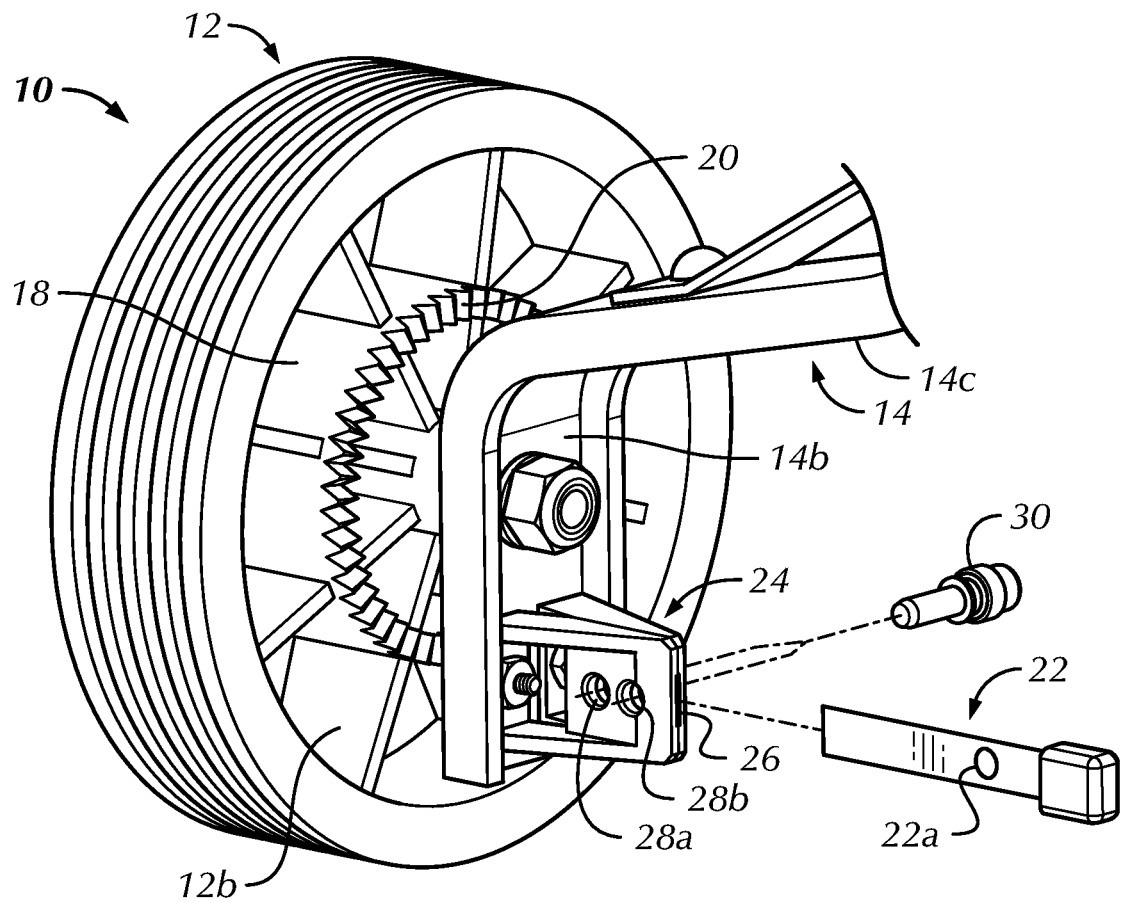
FIG. 4 is an enlarged, partial exploded view of the training wheel assembly of FIG. 2.
Figure 5:
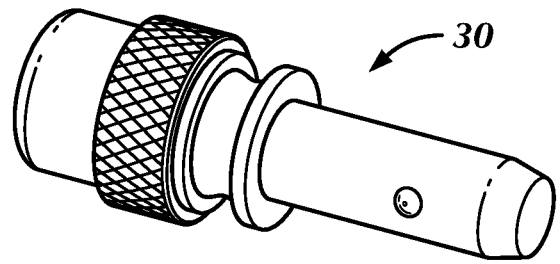
FIG. 5 is an enlarged, front perspective view of a detent pin of the training wheel assembly of FIG. 2.

The training wheel 12 is rotationally attached to the lower section 14b of the assembly frame 14 via a centrally located wheel axle 12a in a manner well understood by those of ordinary skill in the art. As should be understood, the wheel axle 12a defines an axis about which the training wheel 12 rotates. As shown in FIG. 3, the upper section 14a of the assembly frame 14 includes at least one slot 16 for projecting a fastening member 56, e.g., a screw, bolt or the like, therethrough to removably secure the assembly frame 14 to the bicycle frame 54 in a manner well understood by those of ordinary skill in the art. In the illustrated embodiment, the slot 16 is an elongated slot, providing elevational adjustability for the training wheel assembly 10 when mounting to the bicycle 50. Additionally, or alternatively, the upper section 14a of the assembly frame 14 may include more than one slot 16, such as, but not limited to, the two slots 16 shown in FIG. 3.

The training wheel 12 includes a circular/annular hub 18 rotationally fixed with the training wheel 12 and surrounding the axle 12a, e.g., concentric with the axle 12a. In the illustrated embodiment, the annular hub 18 is monolithic with the training wheel 12, i.e., monolithic with a plurality of spokes 12b radially extending from the wheel axle 12a to the circumferential periphery of the training wheel 12, but the disclosure is not so limited. Rather, the annular hub 18 may be rotationally fixed with the training wheel 12, or otherwise integral therewith, in any manner currently known or that later becomes known.

The annular hub 18 includes ratcheted teeth 20 forming a circumferential inner edge of the hub 18 that faces the assembly frame 14 and the bicycle rear wheel 52 when the training wheel assembly 10 is installed on a bicycle 50. An elastically deflectable tongue 22, e.g., constructed of a metal, a polymer, a combination thereof, or the like, oriented substantially parallel to the axle 12a of the training wheel 12, is attached to the assembly frame 14 (as will be described further below) and selectively extends into the rotational path of motion of the ratcheted teeth 20, such that when the training wheel 12 rotates with respect to the assembly frame 14 about the axis defined by the axle 12a, repeated contact of the tongue 22 with the ratcheted teeth 20 generates a sound/noise, e.g., a clicking sound, indicating that the training wheel 12 is rotating. The deflectable tongue 22 is configured, e.g., via material(s) and dimensions, to have sufficient flexibility and elasticity to not obstruct rotation of the training wheel 12 upon the application of torque thereto, e.g., when the bicycle 50 is moving and the training wheel 12 contacts the ground surface. That is, during rotation of the wheel 12 (resulting from the application of torque thereto), each tooth 20 contacts and elastically deflects the deflectable tongue 22, and, thereafter, the deflectable tongue 22 elastically returns substantially to the original orientation thereof and into contact with the following tooth 20, thereby creating a sound. Repetition of this process with each passing tooth 20 creates the repetitive "clicking" sound. The deflectable tongue 22 is also configured to have sufficient stiffness to ultimately obstruct rotation of the training wheel 12 in the absence of an application of torque thereto, e.g., when the bicycle 50 is moving and the training wheel 12 is not contacting the ground surface. That is, in the absence of active application of torque to the training wheel 12, the deflectable tongue 22 decelerates the rotation of the training wheel 12 to a stop upon contact with the ratcheted teeth 20. Accordingly, the sound generated substantially only results from the training wheel 12 being rotated as a result of contacting the underlying ground surface.

As should be understood by those of ordinary skill in the art, the assembly frame 14 of each training wheel assembly 10 is mounted to the bicycle frame 54 such that the underside of the corresponding training wheel 12 is slightly elevationally higher than the underside of the rear wheel 52 of the bicycle 50 contacting the ground surface. Accordingly, when a bicycle rider properly balances the bicycle 50 while riding, the training wheels 12 should not contact the ground surface. The elongated slot(s) 16 of the assembly frame 14 enables a rider/user to selectively adjust the clearance between the training wheel 12 and the ground surface when the bicycle 50 is properly balanced during riding, and, in turn, the amount of acceptable tilt of the bicycle 50 to one side before the training wheel 12 on the same side contacts the ground surface.

Advantageously, extending the deflectable tongue 22 into the path of motion of the ratcheted teeth 20 enables a bicycle rider to hear the clicking sound generated by the repeated contact of the deflectable tongue 22 with the rotating ratcheted teeth 20 of the wheel hub 18 whenever the training wheel 12 is rotating, i.e., due to contacting the underlying ground surface. Further advantageously, and as previously described, the deflectable tongue 22 assists in decelerating and ultimately stopping or preventing rotation of the training wheel 12 when the training wheel 12 is not in contact with the underlying ground surface. Accordingly, while riding, the training wheel assembly 10 audibly notifies the bicycle rider substantially only whenever the bicycle 50 is not sufficiently center balanced, e.g., is sufficiently tilting to one side or the other for a respective training wheel 12 to contact the underlying ground surface. The sound reminds the rider to practice better center balancing of the bicycle 50 to avoid contacting the underlying ground surface with the training wheel 12 on either side of the bicycle frame 54.

Advantageously, the deflectable tongue 22 is attached to the assembly frame 14 in a selectively adjustable manner, such that the deflectable tongue 22 may be purposefully withdrawn from the path of motion of the ratcheted teeth 20 (see, e.g., FIG. 6) to operate the assembly 10 as a standard training wheel assembly (without sound generation). Accordingly, the bicycle rider may select, e.g., manually, whether or not to receive the audible sound indicating that the bicycle 50 is not appropriately center balanced while riding (as previously described). In the non-limiting illustrated embodiment, the deflectable tongue 22 is attached to the assembly frame 14 via a receiving bracket 24 mounted to the assembly frame 14 and extending substantially parallel to the axle 12a of the training wheel 12. The receiving bracket 24 includes an open-ended slot 26 extending therethrough along the length of the bracket 24 for receiving the deflectable tongue 22 therethrough in an orientation substantially parallel to the axle 12a of the training wheel 12. The receiving bracket 24 also includes at least two channels 28a, 28b, respectively, extending through the receiving bracket 24 substantially perpendicularly to, and through, the slot 26, i.e., in a direction substantially perpendicular to the axle 12a of the training wheel 12. The first channel 28a is positioned closer to the training wheel 12 than the second channel 28b. As shown best in FIG. 4, the deflectable tongue 22 includes an aperture 22a extending therethrough in a direction substantially perpendicular to a longitudinal axis of the tongue 22. Accordingly, the deflectable tongue 22 may be adjustably positioned within the slot 26 of the receiving bracket 24 such that the aperture 22a aligns with either the first channel 28a or the second channel 28b.

Figure 2:
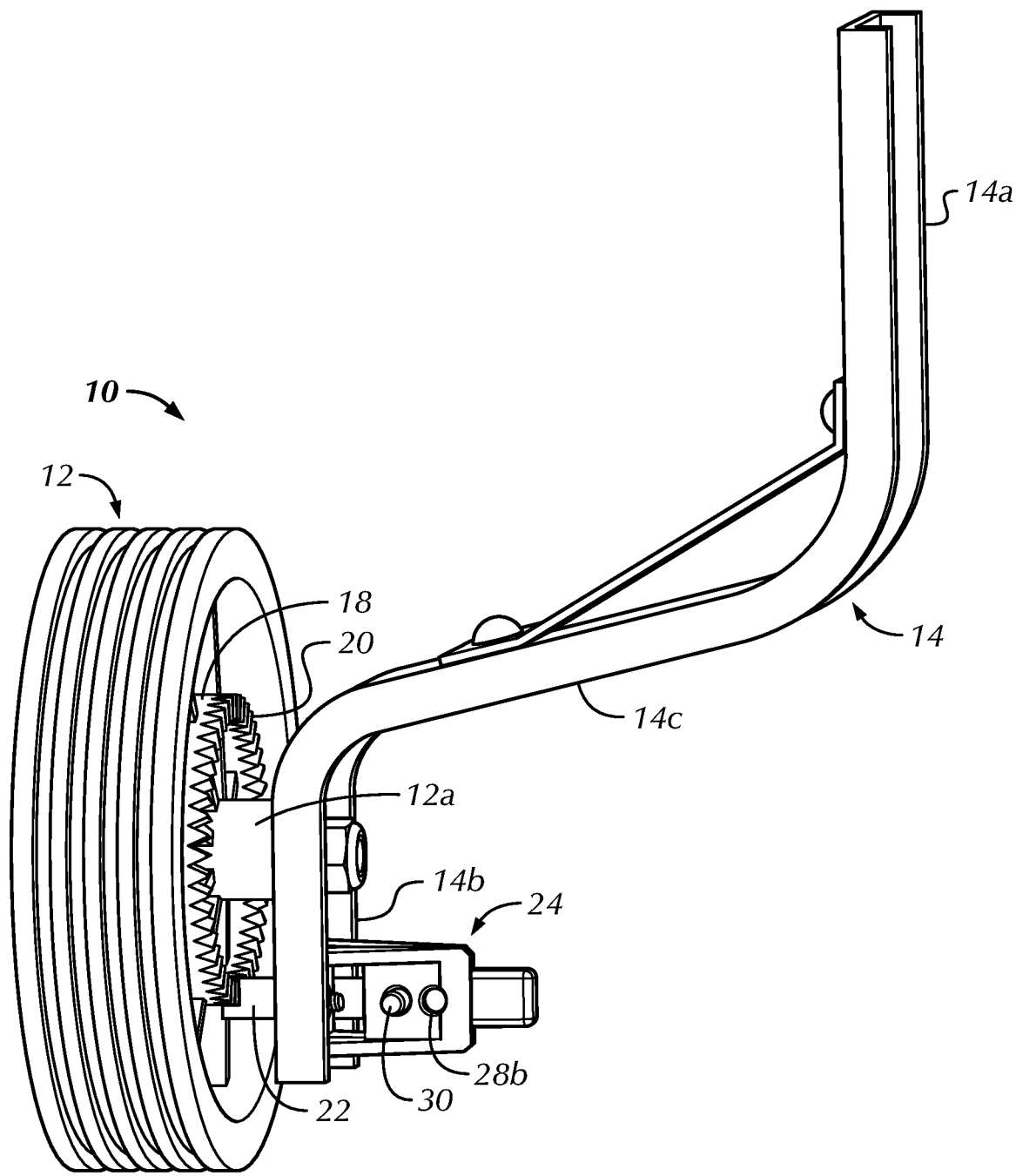
FIG. 2 is front perspective view of the training wheel assembly according to an example embodiment of the present disclosure, with a deflectable tongue thereof in a first position.
Figure 6:
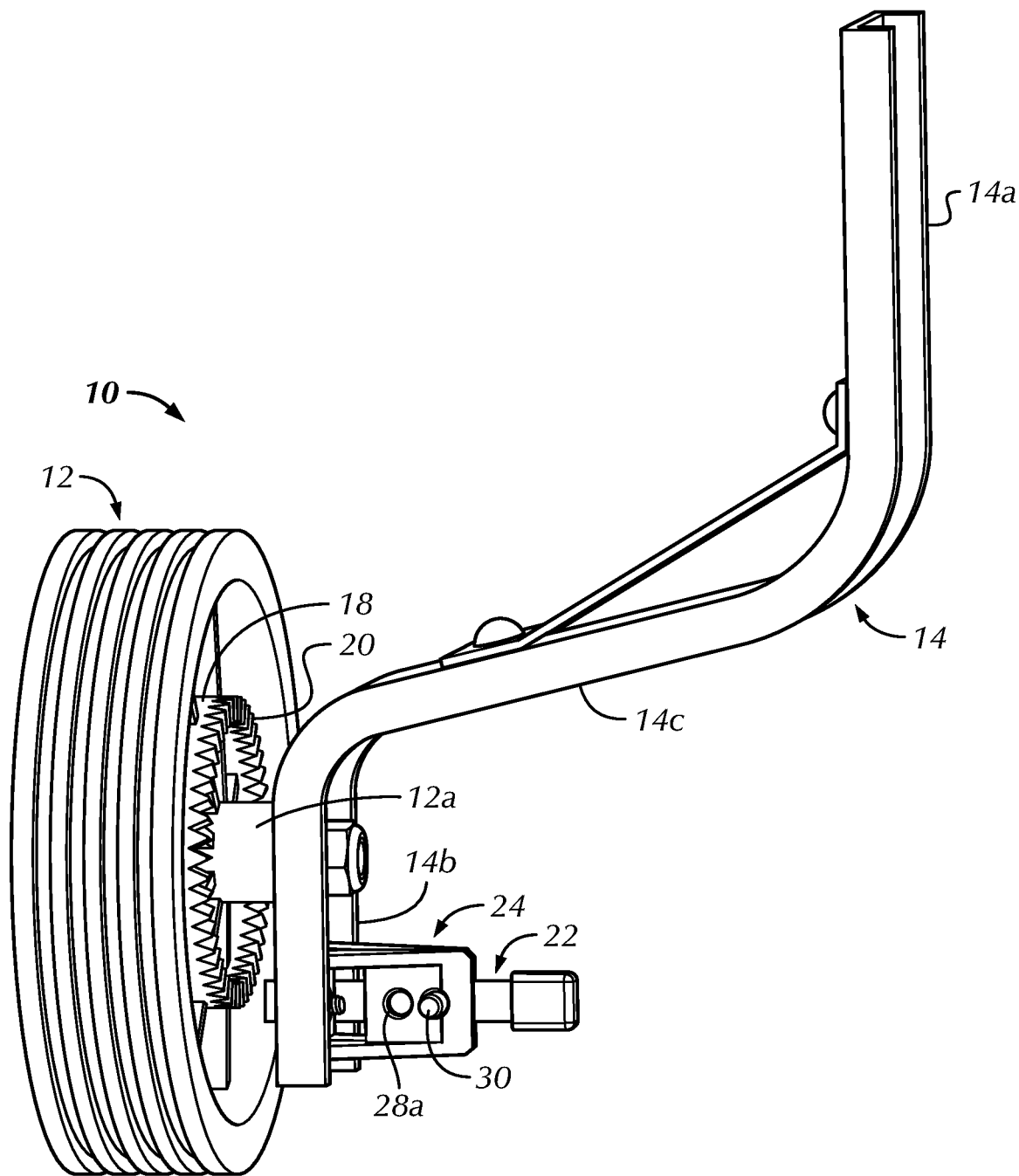
FIG. 6 is a front perspective view of the training wheel assembly of FIG. 2, with the deflectable tongue thereof in a second position.

Selectively aligning the aperture 22a of the deflectable tongue 22 with the first channel 28a (a first position), as shown in FIG. 2, extends the deflectable tongue 22 into the path of motion of the ratcheted teeth 20, thereby generating an audible sound when the training wheel 12 is rotated (as previously described). Conversely, selectively aligning the aperture 22a of the deflectable tongue 22 with the second channel 28b (a second position), as shown in FIG. 6, spaces the deflectable tongue 22 away from the path of motion of the ratcheted teeth 20 of the training wheel 12. Accordingly, rotation of the training wheel 12 will not generate an audible sound in this position. Alternatively, the tongue 22 may be removed entirely from the receiving bracket 24 to avoid generation of the audible sound. After aligning the aperture 22a of the deflectable tongue 22 with one of the first and second channels 28a, 28b of the receiving bracket 24 in the first or second positions of the deflectable tongue 22, a pin 30 is extended through one of the respective channel 28a, 28b and the aligned aperture 22a to secure the position of the deflectable tongue 22. In the illustrated embodiment (see FIG. 5), the pin 30 advantageously takes the form of a quick-release detent pin, but the disclosure is not so limited. For example, the pin 30 may be threaded and the first and second channels 28a, 28b in the receiving bracket 24 may have complementary threads to receive the pin 30. In another example, the pin 30 may be in the form of a nut and bolt assembly, where the bolt is inserted through one of the first and second channels 28a, 28b on one side of the bracket 24 and the nut secures the bolt on the opposing side of the bracket 24. As should be understood by those of ordinary still in the art, the pin 30 may take the form of any fastening rod capable of extending through the aperture 22a and the channels 28a, 28b and remain releasably fixed in place. In the illustrated embodiment, a user withdraws the pin 30 with sufficient force to remove the pin 30 from the requisite channel 28a, 28b (to change the position of the deflectable tongue 22), repositions the deflectable tongue 22 in the desired position and then reinserts in the pin 30 in the channel 28a, 28b aligned with the aperture 22a. As should be understood, the user may reposition the deflectable tongue 22 in the appropriate manner should other forms of the pin 30 be utilized, such as, for example, without limitation, as the alternative described above.

In yet other exemplary embodiments, the deflectable tongue 22 may be coupled to the bracket 24, which itself is movable with respect to the training wheel 12 via a rotatable or spring-loaded clip (not shown) or the like for selectively inserting or withdrawing the deflectable tongue 22 from the moving path of the ratcheted teeth 20. Thus, the structure for selective positioning of the deflectable tongue 22 is not limited to the embodiment shown, and the present disclosure encompasses alternative means for bringing the deflectable tongue 22 into and out of contact with the ratcheted teeth 20.

It will be appreciated by those skilled in the art that changes could be made to the embodiments described above without departing from the broad inventive concepts thereof. It is understood, therefore, that this disclosure is not limited to the particular embodiment(s) disclosed, but it is intended to cover modifications within the spirit and scope of the present disclosure as defined by appended claims.

We claim:

1. A training wheel assembly comprising:
   an assembly frame;
   a training wheel rotatably attached to the assembly frame, the training wheel having:
      a wheel axle extending therefrom and defining an axis about which the training wheel rotates, and
      an annular hub concentric with the wheel axle and rotationally fixed with the wheel axle, the annular hub having a plurality of successive ratcheted teeth facing the assembly frame along an inner edge thereof;
   a receiving bracket mounted to the assembly frame and defining an open-ended slot therein and a first channel and a second channel each extending through the receiving bracket along the open-ended slot;
   an elastically deflectable tongue having an aperture extending therethrough, the elastically deflectable tongue being received within the open-ended slot and selectively adjustably positioned to align the aperture with either the first channel or the second channel, whereby alignment of the aperture with the first channel positions the elastically deflectable tongue in a rotational path of motion of the ratcheted teeth, such that upon rotation of the training wheel with respect to the assembly frame about the axis, contact of the elastically deflectable tongue with successive teeth of the plurality of ratcheted teeth generates an audible sound indicating that the training wheel is rotating, and alignment of the aperture with the second channel spaces the elastically deflectable tongue away from the rotational path of motion of the ratcheted teeth; and
   a fastening rod extending through one of the first channel or the second channel and the aperture aligned therewith.

2. The training wheel assembly of claim 1, wherein the elastically deflectable tongue is configured to be sufficiently elastic to permit rotation of the training wheel upon application of torque thereto while being positioned in the rotational path of motion of the ratcheted teeth thereof, and configured to have sufficient stiffness to at least reduce rotation of the training wheel in the absence of the application of torque thereto.

3. The training wheel assembly of claim 1, wherein the assembly frame comprises an upper, generally linear and vertically extending section, a lower, generally linear and vertically extending section and an interconnecting middle, generally horizontally extending section.

4. The training wheel assembly of claim 3, wherein the training wheel is rotatably attached to the lower section of the assembly frame.

5. The training wheel assembly of claim 3, wherein the upper section of the assembly frame includes at least one slot for projecting a fastening member therethrough to removably mount the assembly frame to a vehicle.

6. The training wheel assembly of claim 5, wherein the assembly frame slot is an elongated slot, providing elevational adjustability for the training wheel assembly when mounting to the vehicle.

7. The training wheel assembly of claim 1, wherein the elastically deflectable tongue is removably received within the open-ended slot.

8. The training wheel assembly of claim 1, wherein the fastening rod comprises a detent pin.

9. The training wheel assembly of claim 1, wherein the training wheel comprises a plurality of spokes radially extending from the wheel axle to a circumferential periphery of the training wheel.

10. The training wheel assembly of claim 9, wherein the annular hub is monolithic with the plurality of spokes.

11. The training wheel assembly of claim 1, wherein the elastically deflectable tongue is oriented substantially parallel to the wheel axle.

12. A bicycle comprising:
a bicycle frame;
a front wheel rotatably attached to the bicycle frame;
a rear wheel rotatably attached to the bicycle frame;
a pair of the training wheel assemblies of claim 1, wherein the pair of training wheel assemblies are mounted to the bicycle frame in a mirrored orientation relative to one another.

13. A training wheel assembly comprising:
an assembly frame;
a training wheel rotatably attached to the assembly frame, the training wheel having:
  a wheel axle extending therefrom and defining an axis about which the training wheel rotates, and
  an annular hub concentric with the wheel axle and rotationally fixed with the wheel axle, the annular hub having a plurality of successive ratcheted teeth facing the assembly frame along an inner edge thereof;

a receiving bracket mounted to the assembly frame and defining an open-ended slot therein and a first channel and a second channel each extending through the receiving bracket along the open-ended slot;

an elastically deflectable tongue having an aperture extending therethrough, the elastically deflectable tongue being removably received within the open-ended slot and being adjustably positioned to align the aperture with either the first channel or the second channel, the elastically deflectable tongue being selectively oriented in (i) a first position, wherein the aperture is aligned with the first channel and the elastically deflectable tongue extends into a rotational path of motion of the ratcheted teeth, whereby upon rotation of the training wheel with respect to the assembly frame about the axis, contact of the elastically deflectable tongue with successive teeth of the plurality of ratcheted teeth generates an audible sound indicating that the training wheel is rotating, or in (ii) a second position, wherein the aperture is aligned with the second channel and the elastically deflectable tongue is spaced away from the rotational path of motion of the ratcheted teeth, thereby eliminating generation of the audible sound upon rotation of the training wheel with respect to the assembly frame about the axis; and a fastening rod extending through one of the first channel or the second channel and the aperture aligned therewith, wherein the elastically deflectable tongue is configured to be sufficiently elastic to permit rotation of the training wheel upon application of torque thereto while in the first position, and configured to have sufficient stiffness to at least reduce rotation of the training wheel in the absence of the application of torque thereto while in the first position.

14. A bicycle comprising:

a bicycle frame;

a front wheel rotatably attached to the bicycle frame;

a rear wheel rotatably attached to the bicycle frame;

a pair of the training wheel assemblies of claim 13, wherein the pair of training wheel assemblies are mounted to the bicycle frame in a mirrored orientation relative to one another.

* * * * *